(12) United States Patent
Guevorkian et al.

(10) Patent No.: US 7,031,389 B2
(45) Date of Patent: Apr. 18, 2006

(54) METHOD FOR PERFORMING MOTION ESTIMATION IN VIDEO ENCODING, A VIDEO ENCODING SYSTEM AND A VIDEO ENCODING DEVICE

(75) Inventors: David Guevorkian, Tampere (FI); Aki Launiainen, Tampere (FI); Petri Liuha, Tampere (FI)

(73) Assignee: Nokia Corporation, Espoo (FI)

( * ) Notice: Subject to any disclaimer, the term of this patent is extended or adjusted under 35 U.S.C. 154(b) by 607 days.

(21) Appl. No.: 10/231,228

(22) Filed: Aug. 27, 2002

(65) Prior Publication Data
US 2003/0118103 A1 Jun. 26, 2003

(30) Foreign Application Priority Data
Sep. 6, 2001 (FI) .................................. 20011768

(51) Int. Cl.
H04N 7/12 (2006.01)
(52) U.S. Cl. ............................. 375/240.16; 375/240.17
(58) Field of Classification Search ........... 375/240.16, 375/240.17; 348/416.1, 699–700; 382/236, 382/238, 240; 386/111
See application file for complete search history.

(56) References Cited

U.S. PATENT DOCUMENTS

| | | |
|---|---|---|
| 5,652,625 A | 7/1997 | Chen et al. |
| 5,838,392 A | 11/1998 | Chen et al. |
| 5,864,372 A | 1/1999 | Chen et al. |
| 6,011,870 A | 1/2000 | Jeng et al. |
| 6,122,320 A * | 9/2000 | Bellifemine et al. ........ 375/240 |
| 2002/0080880 A1* | 6/2002 | Park et al. ............. 375/240.16 |

FOREIGN PATENT DOCUMENTS

WO 0108402 2/2001

OTHER PUBLICATIONS

Kittitornkun et al, "Frame-Level Pipelined Motion Estimation Array Processor", IEEE Transactions On Circuits and Systems For Video Technology, vol. 11, No. 2, Feb. 2001, pp. 248-251.*
"VLSI Implementation of the Motion Estimator with Two-Dimensional Data-Reuse" by Y. Lai et al, IEEE.
Transactions on Consumer Electronics, IEEE Inc. New York, U.S. vol. 44, No. 3, Aug. 1998, pp. 623-628.

* cited by examiner

Primary Examiner—Vu Le (57) ABSTRACT

A current video block of a frame to be encoded comprises a set of first data values, and at least one other video block of another frame comprises a set of second data values. Data value pairs are formed of data values from said set of first data values and equal number of corresponding data values from said set of second data values. A combined comparison value is formed by defining comparison values, each of which is defined by using data values of one data value pair of said data value pairs. Said data value pairs are divided into at least two sub-sets of data value pairs each sub-set comprising equal number of data value pairs. The calculation of the comparison values is interlaced such that the calculation of comparison values of one sub-set of data value pairs is initiated in a time after initiating and before completing the calculation of comparison values of another sub-set of data value pairs.

19 Claims, 9 Drawing Sheets

METHOD FOR PERFORMING MOTION ESTIMATION IN VIDEO ENCODING, A VIDEO ENCODING SYSTEM AND A VIDEO ENCODING DEVICE

FIELD OF THE INVENTION

The present invention relates to a method, a system, and a video encoding device for performing video motion estimation in video encoding.

BACKGROUND OF THE INVENTION

Video encoding systems are known in which an image to be encoded is divided into blocks. These blocks are then encoded and transmitted to a decoding device or stored into a storage medium. For reducing the amount of information to be transmitted, different compression methods have been developed, such as MPEG-2 (Motion Picture Experts Group). In the transmission of video images, image compression can be performed either as interframe compression, intraframe compression, or a combination of these. In interframe compression, the aim is to eliminate redundant information in successive image frames. Typically, images contain a large amount of such non-varying information, for example a motionless background, or slowly changing information, for example when the object moves slowly. In interframe compression, it is also possible to utilise motion compensation, wherein the aim is to detect such larger elements in the image which are moving, wherein the motion vector and some kind of difference information of this entity is transmitted instead of transmitting the pixels representing the whole entity. Thus, the direction of the motion and the speed of the subject in question is defined, to establish this motion vector. For compression, the transmitting and the receiving video terminals are required to have such a high processing rate that it is possible to perform compression and decompression in real time.

Typically, image blocks are grouped together to form blocks. The block usually contains 16 rows by 16 pixels of luminance samples, mode information, and possible motion vectors. The block is divided into four 8×8 luminance blocks and to two 8×8 chrominance blocks. Scanning (and encoding/decoding) proceeds block by block, conventionally from the top-left to the bottom-right corner of the frame. Inside one block the scanning (and encoding/decoding) order is from the top-left to the bottom-right corner of the block.

In MPEG-2 compression, an image is Discrete Cosine Transform (DCT)-coded in blocks so that the block size is 8×8 pixels. The luminance level to be transformed is in full resolution. Both chrominance signals are subsampled, for example a field of 16×16 pixels is subsampled into a field of 8×8 pixels. The differences in the block sizes are primarily due to the fact that the eye does not discern changes in chrominance equally well as changes in luminance, wherein a field of 2×2 pixels is encoded with the same chrominance value.

The MPEG-2 defines three frame types: an I-frame (Intra), a P-frame (Predicted), and a B-frame (Bi-directional). The I-frame is generated solely on the basis of information contained in the image itself, wherein at the receiving end, this I-frame can be used to form the entire image. The P-frame is formed on the basis of a preceding I-frame or P-frame, wherein at the receiving stage the preceding I-frame or P-frame is correspondingly used together with the received P-frame. In the composition of P-frames, for instance motion compensation is used to compress the quantity of information. B-frames are formed on the basis of the preceding I-frame and the following P- or I-frame. Correspondingly, at the receiving stage it is not possible to compose the B-frame until the corresponding I-frame and P- or I-frame have been received. Furthermore, at the transmission stage, the order of these P- and B-frames is usually changed, wherein the P-frame following the B-frame is received first, which accelerates the reconstruction of the image in the receiver.

Of these three image types, the highest efficiency is achieved in the compression of B-frames. It should be mentioned that the number of I-frames, P-frames and B-frames can be varied in the application used at a given time. It must, however, be noticed here that at least one I-frame must be received at the receiving end, before it is possible to reconstruct a proper image in the display device of the receiver.

The aim of the motion estimation is to find such a block (a reference block) within a search area of some reference frame in a video sequence that is most similar to a given block within the current frame (block under examination). Among the variety of motion estimation algorithms, the most popular are those based on block matching where a sum of absolute differences (SAD) is used as the similarity criterion between frame blocks. Given two ordered sets of data $X=\{x_1, \ldots, x_K\}$ and $Y=\{y_1, \ldots, y_K\}$, the value of the SAD is defined as:

$$SAD(X, Y) = \sum_{i=1}^{K} |x_i - y_i|, \qquad (1)$$

In some publications SAD is defined as the sum $SAD(X, Y)$ divided by the number K of its addends. In that case it may also be called mean absolute error (MAE). Since in the most of the cases K is a power of two, these two definitions are substantially equivalent from the implementation point of view because the later one may simply be obtained by shifting the value of the former one by certain number of bits.

Figure 9:
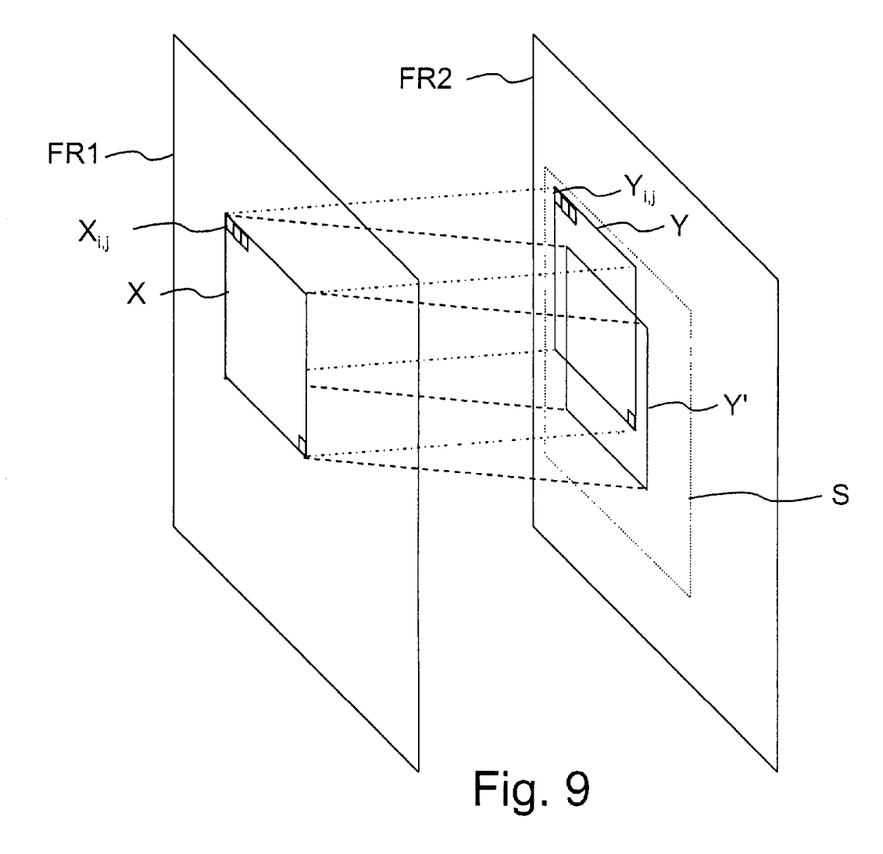
FIG. 9 shows a method for performing video motion estimation in video encoding.

In a video encoding context, the SAD is computed between every (16×16) block X of every current interframe (in practice almost every frame of a video sequence) and a plurality of (16×16) blocks Y, Y' within a search area of one or more reference frame(s) (see FIG. 9). Thus, SAD is applied many times and even a smallest improvement in the execution time of one SAD operation leads to significant savings in total video processing time. Naturally, on the other hand, the hardware utilized for computation of SAD should not be too large or power consuming especially in portable/wireless video processing applications.

There are many different motion estimation algorithms utilizing different search strategies in order to reduce the number and/or the size of SAD operations with possibly less degradation in the quality of the encoded video. They can roughly be grouped into two categories: data independent search where the choice of the next pair of X and Y blocks does not depend on the SAD value obtained at the previous step, and data dependent search. Normally, the data dependent search strategies require less SAD operations to be implemented. However, most of hardware implementations are based on data independent motion estimation algorithms due to the simplicity of organizing regular data movements typical to such algorithms. Common to data dependent strategies is that there are several options to choose the next pair of X and Y blocks and which pair will be chosen depends on the current SAD value.

According to recent investigations different motion estimation algorithms consume approximately 40%–80% of the total video encoding time when implemented in a General-Purpose Processor (GPP). The basic operation in the block matching motion estimation algorithms is the SAD, which is applied many times during the video encoding process. In typical fast motion estimation algorithms, SAD computation is repeated approximately 30 times for almost every block (usually, of the size (16×16)) within the video sequence. Even for a 15 frames per second QCIF resolution (Quarter Common Intermediate Format) video sequences this would mean at least 44550 256-point (16×16) SAD computations per second. In a purely software implementation on, e.g. ARM9E microprocessor, which is a typical microprocessor in embedded systems, computing one 256-point SAD takes several thousands of clock cycles. This means that even hundreds of millions of cycles per second are spent only for motion estimation in a software implementation of video encoding.

Due to the importance of the problem, many motion estimation devices have been reported in the literature recently. They can be classified into two categories: those supporting one or another search strategy for motion estimation but not considering details of SAD implementation; and those which essentially propose specialized architectures for SAD computation irrelevant on the motion estimation strategy. For example, the U.S. Pat. No. 5,864,372 discloses an apparatus for implementing a block matching algorithm for motion estimation in video image processing. The apparatus receives the pixel data of an original image block and the pixel data of a compared image block selected from a number of compared image blocks during video image processing. The selected image blocks are compared to determine a movement vector. The apparatus has a multistage pipelined tree-architecture that includes four stages. The first pipeline stage (computational stage) produces corresponding pairs of difference data and sign data. The second pipeline stage (compression stage) includes a compression array that receives all the difference data and sign data, which are added together to produce two (sum and carry term) rows of compressed summation and sign data. The third pipeline stage (summation stage) in the pipeline receives the compressed summation and sign data and produces a mean absolute error for each of the compared image block pixels. A last pipeline stage (minimization stage) receives the mean absolute error for each of the compared image blocks and determines a minimum mean absolute error from among them. The compression array includes a number of full and half adders or a number of 4/2 compressors arranged in a multi-level configuration in which none of the adder operand inputs and the carry-in inputs is left unconnected.

Figure 1:
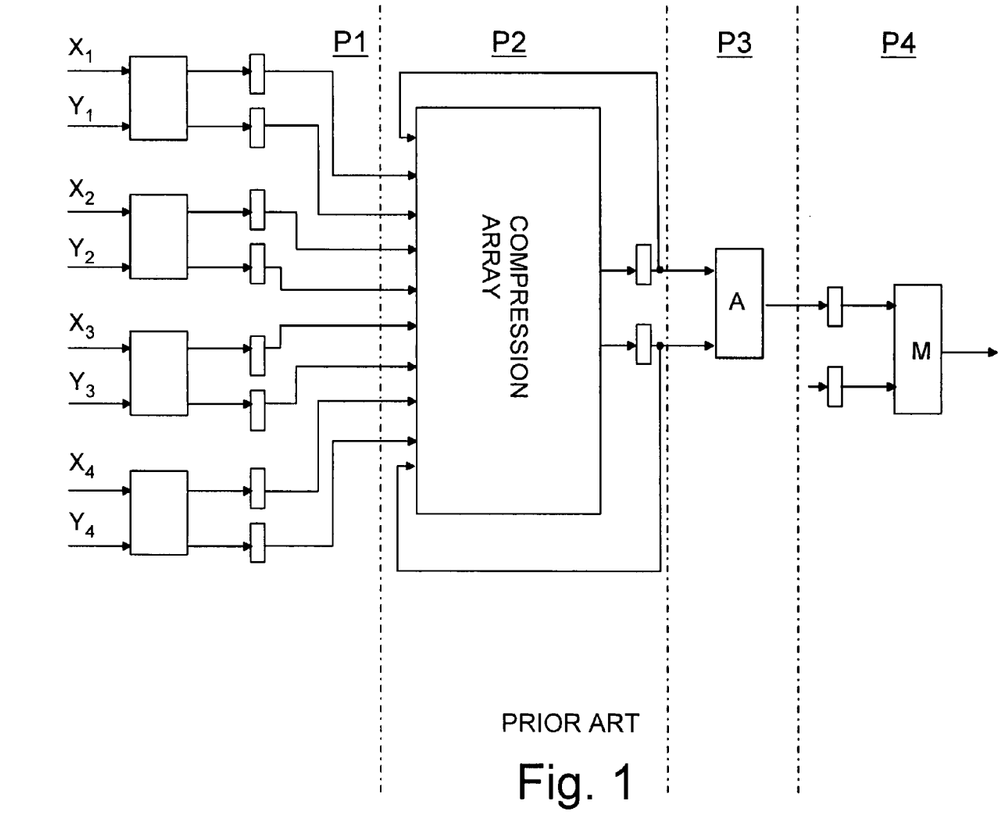
FIG. 1 shows, in a simplified block diagram, a prior art SAD calculation means.
Figure 2:
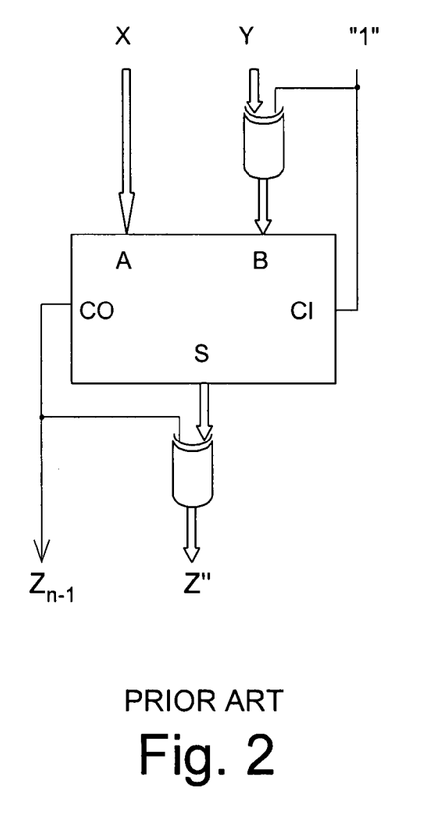
FIG. 2 shows, in a simplified block diagram, the structure of a prior art DS (Difference-Sign) unit of the prior art SAD calculation means.

The apparatus disclosed in the U.S. Pat. No. 5,864,372 is illustrated in FIG. 1. The first pipeline stage consists of several (m) computational units (DS, Difference-Sign). FIG. 1 corresponds to the case of m=4. The computational unit structure is shown in FIG. 2. The $i^{th}$ computational unit, i=1, . . . , m, has two n-bit inputs $X_i$ and $Y_i$, one n-bit output $A_i$ and one single-bit output $B_i$. The output $B_i$ (sign data) is the sign bit of the difference $X_i-Y_i$ and the output $A_i$ (difference data) is formed from the n least significant bits of the difference which are either inverted if $B_i=1$ (the difference is negative) or not if $B_i=0$ (the difference is non-negative).

Thus, the input-output relation of a computational unit is such that $$a+b=|x-y|, \quad (2)$$

where x and y are the values at the inputs of the computational unit, a is the value at its n-bit output (difference data) and b is the value at its 1-bit output (sign data).

The second pipeline stage is a compression array which is essentially a carry save adder tree having 2m inputs $A_i$ and $B_i$, i=1, . . . , m, coming from the first pipeline stage, and two feedback inputs from sum and carry outputs of the array itself. The compression array may be constructed either from full adders (FAs) or 4/2-ratio compressors. Its width and depth (number of levels) and, therefore, the delay essentially depend on the number m of parallel channels (computational units) of the first stage. This dependency is presented in Table 1. In this table, $N_{FA}$ and $N_{4/2}$ represent the number of levels in the compression array for the full adder- and 4/2-ratio compressor based configurations, respectively. $D_{FA}$ and $D_{4/2}$ represent estimated time delays of the corresponding compression array configurations expressed in units of the basic time delay amount, τ, for one two-input NAND logic gate. Note that it is assumed that one full adder has the delay of two series connected NAND gates, and one 4/2-ratio compressor element has the delay of three series connected NAND gates.

The third pipeline stage is essentially an adder for adding the final values of sum and carry outputs of the compression array. In fact the SAD is obtained at the output of the third stage. Let us note that in order to compute the correct SAD value the adder of the third stage should have the precision of n+log$_2$ K bits (practically, 16 bits in video encoding context).

TABLE 1

| m | $N_{FA}$ | $D_{FA}$ | $N_{4/2}$ | $N_{4/2}$ |
|---|---|---|---|---|
| 4 | 3 | 6τ | 2 | 6τ |
| 8 | 5 | 10τ | 3 | 9τ |
| 16 | 6 | 12τ | 4 | 12τ |
| 32 | 8 | 16τ | 5 | 15τ |
| 64 | 10 | 20τ | 6 | 18τ |
| 128 | 11 | 22τ | 7 | 21τ |

The fourth stage of the apparatus is the minimum evaluation stage. Every time when new SAD value is obtained at the third pipeline stage, it is compared to the current minimum SAD value held in the minimum value evaluator unit M. The value which is smaller is selected and stored in the minimum evaluator unit as the new minimum value. Once computations of SADs between a given block $X^{(c)}$ within the current frame and all the corresponding blocks $Y^{(r,c)}$ within the search area of the reference frame are complete, the relative shift between $X^{(c)}$ and such a block $Y^{(r,c)}$ for which the minimum has been achieved is identified as the motion vector for $X^{(c)}$.

During the operation of the apparatus, input $\{x_1, \ldots, x_K\}$ and $\{y_1, \ldots, y_K\}$ enter, portion by portion, to the first pipeline stage. At the $t^{th}$ operating step, t=1, . . . , ⌈K/m⌉, data portion $\{x_{(t-1)m+1}, \ldots, x_{tm}\}$ and $\{y_{(t-1)m+1}, \ldots, y_{tm}\}$ enter to inputs $X_1, \ldots, X_m$ and $Y_1, \ldots, Y_m$, respectively. At the next operating step, the corresponding difference and sign data are formed at the outputs of the computational units which enter to the compression array to be accumulated to the current values of the sum and carry outputs of the array.

Clearly, after ⌈K/m⌉+3 operating steps the final sum and carry terms will be formed at the output of the compression array and after one more operating step the SAD value will be computed at the output of the adder in the third pipeline stage. The minimum evaluation unit will consume another operating step to select the coordinates of the current motion vector.

The duration of the operating step is determined by the throughput of the slowest pipeline stage. In the apparatus according to the publication U.S. Pat. No. 5,864,372, the slowest part is considered to be the minimum evaluation unit. However, this unit as well as the adder of the third stage operates only two cycles for a given pair of input data sets while the first two stages operate ⌈K/m⌉+3 cycles. If K is sufficiently large with respect to m (which is the practical case), then it is more beneficial to halt the first two stages after ⌈K/m⌉+3 cycles when the last two ones start operating instead of immediately starting to process next pair of input data sets. This way, the clock cycle duration is determined by the throughput of the slowest between only the first two stages.

The throughput of the first pipeline stage is essentially the throughput of an n-bit (8-bit) adder/subtracter. Different adder/subtracters may be used resulting in different throughputs. For the ease of description it is considered here that standard 8-bit carry-ripple adders are used. It is assumed in U.S. Pat. No. 5,864,372 that the delay of a full adder is substantially equivalent to the delay of two series connected NAND gates. Thus the delay between two successive outputs of computational units is substantially equal to 16τ, where τ is the duration of the basic operational clock cycle (the delay of a NAND gate). Comparing to the delay of the compression array given in Table 1, it can be seen that the first pipeline stage is slower than the second one for the cases of up to 32 computational units within the first pipeline stage. In the cases of more computational units (which are, in fact, impractical due to large silicon area and input bus width needed) the compression array is split into two pipeline stages so that the first pipeline stage remains the slowest. Thus the duration of the operating step of the apparatus is 16τ, irrelevant of how many computational units are involved into the first pipeline stage. The compression array should also be clocked at the same operation step even though it could be clocked faster in the most of the practical cases because the delay of the compression array is less than 16τ, when the number of inputs to the compression array is less than 32 as is shown in Table 1.

The prior art apparatus has several drawbacks. Pipeline stages of the apparatus, more importantly, the first two of them, are poorly balanced since they have essentially different delays. For the cases of reasonable numbers of parallel computational units within the first stage, say m=4, 8, 16, the compression array of the second stage is, respectively, 2.7, 1.6, and 1.3 times faster than the first stage if standard carry-ripple adders are used within computational units as can be seen from Table 1. Thus, the compression array of the apparatus is utilized at approximately only 37%, 62.5%, and 77% of its capacity.

Adjusting the delays of the (first two) pipeline stages of the apparatus in order to achieve better balancing between them is only possible either by using faster adders/subtracters within computational units or by increasing the number of pipeline stages. Both cases lead to significant increase in silicon area and power consumption.

The width and the depth of the compression array essentially grow with the number of computational units within the first stage (see Table 1). Because the compression array is faster than the computational unit the compression array is not effectively utilized in prior art systems. Reducing the size of the compression array would reduce not only the gate count but also the delay due to a less number of its levels. Possibility of reducing the size of the compression array would also add flexibility in adjusting the first two pipeline stages.

The input bus width of the prior art apparatuses grows proportionally with the number of parallel computational units in the first stage thus restricting the practical use since in the most of the general purpose processors or digital signal processors (DSP) rather narrow busses are provided for interconnection with an accelerator. Though including input buffers with the apparatus could solve the problem, this would mean a significant increase in the gate count.

SUMMARY OF THE INVENTION

It is an aim of the present invention to provide an improved method, system and apparatus for performing motion estimation in video encoding. The invention is based on the idea, that the input data pairs are grouped and the process for calculating the difference and sign data for a new group of data pairs is initiated before the calculation of the difference and sign data for previous groups of data pairs of the same pair of video blocks is complete. This is achieved by splitting the group of computational units of the first pipeline stage of the SAD calculation means into two or more substantially similar sub-groups and by distributing the difference and sign data calculation process among these sub-groups. The computational units of each sub-group share the same input/output lines and operate in a time interlaced manner with a time offset of one operating step. The method according to the present invention is primarily characterized in that the calculation of said comparison values is interlaced such that the calculation of comparison values of one sub-set of data value pairs is initiated in a time after initiating and before completing the-calculation of comparison values of another sub-set of data value pairs. The video encoding system according to the invention is primarily characterized in that the system further comprises means for interlaced calculation of said comparison values comprising means for initiating the calculation of comparison values of one sub-set of data value pairs in a time after initiating and before completing the calculation of comparison values of another sub-set of data value pairs. The video encoding device according to the invention is primarily characterized in that the device comprises means for interlaced calculation of said comparison values comprising means for initiating the calculation of comparison values of one sub-set of data value pairs in a time after initiating and before completing the calculation of comparison values between value pairs of another sub-set of data value pairs.

The present invention provides significant advantages as compared with prior art solutions. The compression array has smaller number of inputs leading to both gate count and delay reduction of the array. This means a significant reduction of the total silicon area needed to implement the invention as compared to prior art when they both consist of the same number of parallel channels (computational units in the first pipeline stage).

The first two pipeline stages of an advantageous embodiment of the invention are better balanced. The duration of the operating step of the SAD calculation according to the method of the present invention is approximately the same as the delay of the second stage. This is much shorter compared to the delay of the first pipeline stage which is the lower bound for the duration of the operating step if the apparatus according to the publication U.S. Pat. No. 5,864,372 is used. Although the total number of operating steps becomes larger, the total processing time becomes smaller due to better balancing between stages.

Reduction of the compression array size also means that higher speed architectures having more parallel computational units are becoming practically feasible.

Another reason making the higher speed realizations of the architecture practically feasible is the possibility of sharing the input bus between groups of computational units. In the architecture according to the invention the bus width does not grow proportionally with respect to the number of channels as is the case in prior art solutions.

The hardware is more efficiently utilized meaning not only smaller chip area for the same throughput as in prior art but also lower power consumption. This can be achieved since the compression array needs less time to wait for the first pipeline stage to provide data and since smaller number of gates are activated during the operation.

Obviously, in practical implementations of the invention the gate count of the SAD calculation means can be reduced, especially in the cases of larger number m of computational units within the first pipeline stage. The width and the depth of the compression array are essentially growing with respect to m in prior art apparatuses but not in the SAD calculation means according to the present invention. The invention also allows to reduce the operating step duration from that of the first pipeline stage to that of the second one (or close to that) which was already shorter in prior art apparatus but is even shorter in the apparatus according to the present invention since the compression array is scaled down and, therefore, has smaller depth (smaller number of levels). Thus the invention reduces both the gate count and the processing time as compared to prior art solutions. Also the input bus width requirements are now reduced since all the computational units of one group share one input port. The number of the groups of computational units and the number of computational units within each group play a role of parameters adding flexibility in order to achieve better balancing between the first two stages in actual implementations of the invention.

BRIEF DESCRIPTION OF THE DRAWINGS

In the following the invention will be described in more detail with reference to the appended drawings, in which.

DETAILED DESCRIPTION OF THE INVENTION

In the following the invention will be described for a general case assuming K pairs of n-bit input data even though in the video encoding context, K=256, n=8 is the most common case. It should be noted that sum of absolute differences might be used not only in video encoding but also in other applications such as medical imaging, radar imaging, and other signal processing tasks where pattern recognition is performed in real time (Electrocardiogram (ECG) devices, implantable cardioverter-defibrillator (ICD) devices recording the function of the heart, sound processing, etc.).

FIG. 9 shows the principle of the method for performing video motion estimation in video encoding. In FIG. 9 only two frames FR1, FR2 are shown for clarity. The frame FR1 to be encoded comprises one or more blocks X which comprise pixel values $X_{i,j}$ of which only a few are shown. In the reference frame FR2 a search area S is defined. The search area S defines the area in which the comparison between the current block X of the frame FR1 to be encoded and the reference block Y of the reference frame FR2 is performed. However, it is obvious that in some embodiments it is possible to use the whole area of the reference frame FR2 as the search area S. In the method a reference block Y, Y' is selected, one by one, for comparison with the current block X. The search process will be continued until the whole search area S is examined or if another possibly defined condition for terminating the search is fulfilled. In the following the search will be described in more detail.

Figure 3:
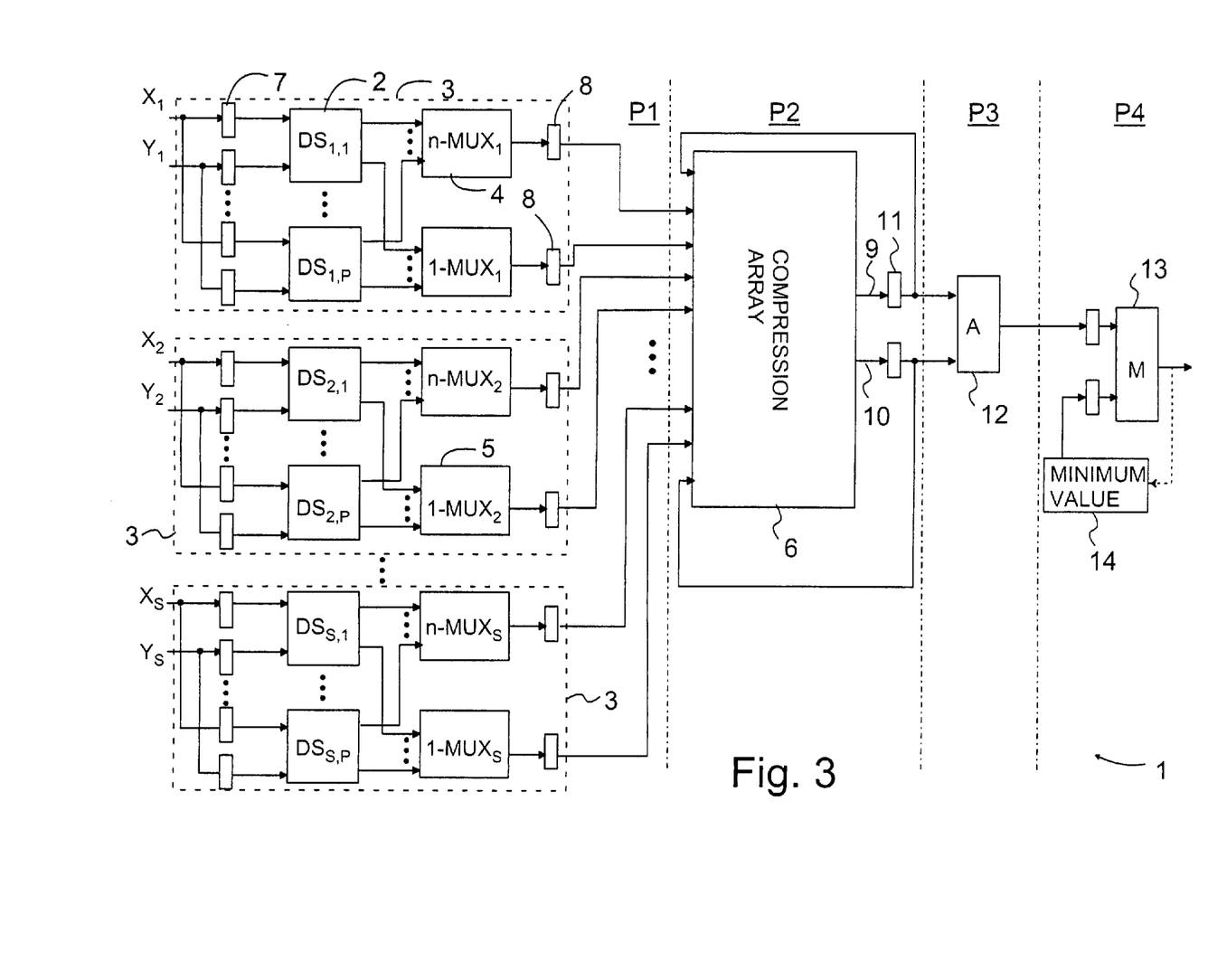
FIG. 3 shows, in a simplified block diagram, a SAD calculation means according to the invention.

The SAD calculation means 1 according to an advantageous embodiment of the invention is depicted in FIG. 3. It comprises four pipeline stages P1, P2, P3, P4 having better balancing between the first two pipeline stages P1, P2 compared with prior art. This is achieved by arranging the computational units 2 (DS) of the first pipeline stage P1 into groups 3. The first pipeline stage consists of m=sp computational units 2 ($DS_{1,1}, \ldots, DS_{1,p}, \ldots, DS_{2,1}, \ldots, DS_{2,p}, \ldots, DS_{s,1}, \ldots, DS_{sp}$), which are grouped into s groups each consisting of p computational units. Each computational unit 2 of a group 3 shares the same inputs $X_1$, $Y_1$; $X_2$, $Y_2$; ...; $X_s$, $Y_s$; but at different clock cycles. The outputs of the computational units 2 of the groups 3 are connected to inputs of two multiplexers 4, 5 such that the n-bit output of the computational unit 2 is connected to one of the n-bit inputs of the first multiplexer 4 and the 1-bit output of the computational unit 2 is connected to one of the 1-bit inputs of the second multiplexer 5. The first multiplexers 4 comprise p n-bit inputs and one n-bit output. Respectively, the second multiplexers 5 comprise p 1-bit inputs and one 1-bit output. This arrangement enables the scaling down of the compression array 6 of the second stage P2. The computational units 2 of one group 3 operate with a time offset of approximately one operating step having the duration $T_p$ which now approximately equals to the delay of the compression array. Respectively, sign and difference data are formed at the outputs of computational units 2 also with the time offset of approximately one operating step. Output pairs of all the computational units 2 of one group 3 are connected to a single pair of inputs of the compression array 6 through multiplexers 4, 5 so that at every operating step the computational unit 2 which have just computed the sign and difference data is connected to the compression array 6. Thus the compression array receives and accumulates new sign and difference data portion at every operating step alternating between different computational units 2 of every group 3.

The duration $T_p$ of the operating step approximately equals to the delay of the first stage in the prior art apparatus wherein significant improvement in processing time can be achieved by using the SAD calculation means 1 according to the invention.

Figure 4:
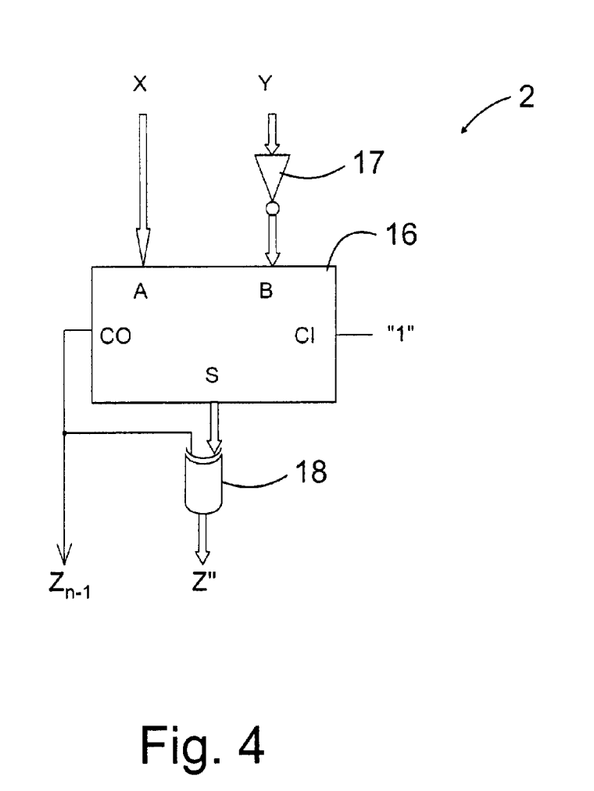
FIG. 4 shows, in a simplified block diagram, the structure of a DS unit of the SAD calculation means according to an advantageous embodiment of the invention.

One advantageous embodiment of the computational unit 2 of the first pipeline stage P1 is shown in FIG. 4 but it should be evident that other embodiments of the computational unit 2 can be used with the invention. Every computational unit 2 ($DS_{i,j}$, i=1, ..., s, j=1, ..., p), has two inputs $X_{i,j}$ and $Y_{i,j}$, one n-bit output $A_{i,j}$ and one single-bit output $B_{i,j}$ with the same input-output relation as in the apparatus of U.S. Pat. No. 5,864,372. It is assumed here that the throughput of each computational unit 2 is p operating steps per a pair of input data. The computational unit 2 comprises an adder 16 having two n-bit data inputs A, B, one n-bit data output S, a carry-in CI and carry-out CO. Values of the first data set X are inputted to the first data input A and values of the second data set Y are inputted to the second data input B through an inverter unit 17. The inverter unit 17 forms one's complement of the values of the second data set. The carry-in CI is set to a logical 1 value, wherein the adder 16 calculates the difference of the values inputted to the data inputs X−Y. The calculation unit 2 further comprises an XOR unit 18 which inverts the bits of the output S of the adder 16 if the carry-out CO is set i.e. the calculated difference is negative (X<Y). Otherwise the XOR unit 18 leaves the output S of the adder 16 as it is i.e. the calculated difference is non-negative (X≧Y). The carry-out signal is used as the sign value and the output of the XOR unit 18 is used as the difference value. It is evident that other implementations of the computational units 2 can be used in the first pipeline stage.

Figure 5A:
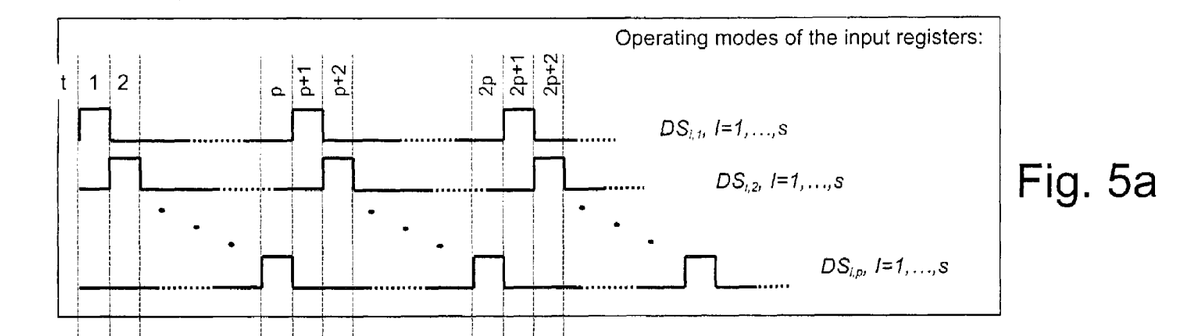
FIG. 5a shows as a timing diagram the operating cycles of input registers of the first pipeline stage of the SAD calculation means according to an advantageous embodiment of the invention.

As was mentioned above, the SAD calculation means 1 has s pairs of n-bit inputs, the $i^{th}$ pair $(X_i,Y_i)$, i=1, ..., s, shared by all the computational units $DS_{i,1}$, ..., $DS_{i,p}$ of the ith group. The pair of inputs $(X_i, Y_i)$, i=1, ..., s, of the SAD calculation means 1 is connected to the pair of inputs $(X_{i,j}, Y_{i,j})$ of every computational unit $DS_{i,j}$, j=1, ..., p, of the $i^{th}$ group through the input registers 7. Every one of these input registers 7 of the first pipeline stage are open only during one out of every p operating cycles of the SAD calculation means 1. This is shown in FIG. 5a as a timing diagram. This way, at every operating step, each input pair $(X_i,Y_i)$, i=1, ..., s, of the SAD calculation means 1 is actually connected to the pair of inputs $(X_{i,j},Y_{i,j})$ of only one computational unit while the other connections are inactive since the corresponding input registers of the first pipeline-stage are closed for writing. The input registers of the first pipeline stage at the inputs of the first computational units $DS_{i,1}$ of every group i=1, ..., s are open during the first of every p operating steps, the input registers of the first pipeline stage at the inputs of the second computational units $DS_{i,2}$ of every group are open during the second of every p operating steps, etc. In general, at the operating step t=1, 2, ..., ⌈K/s⌉ the pair of inputs $(X_i, Y_i)$, i=1, ..., s, of the SAD calculation means 1 is actually connected to the input registers of the $u^{th}$ computational unit $DS_{i,u}$ of the $i^{th}$ group of computational units, where u=(t−1)mod p+1. Thus, every pair of inputs $(X_i, Y_i)$, i=1, ..., s, of the SAD calculation means 1 is spatially shared by but temporally distributed over the $i^{th}$ group of computational units.

Figure 5B:
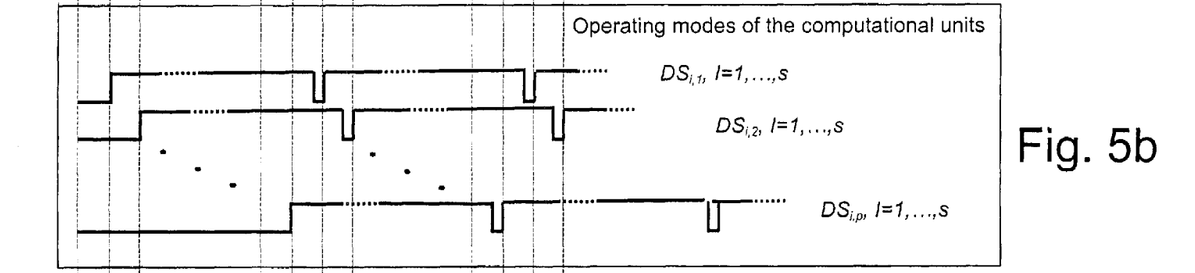
FIG. 5b shows as a timing diagram the operating cycles of the computational units of the SAD calculation means according to an advantageous embodiment of the invention.

During the operation of the SAD calculation means 1 according to the invention, data sets $X=\{x_1, ..., x_K\}$ and $Y=\{y_1, ..., y_K\}$ are entered, portion by portion, to the inputs of the SAD calculation means 1. At the $t^{th}$ operating step, t=1, ..., ⌈K/s⌉, data portion $\{x_{(t-1)s+1}, ..., x_{ts}\}$ and $\{y_{(t-1)s+1}, ..., y_{ts}\}$ are entered to inputs $X_1, ..., X_s$ and $Y_1, ..., Y_s$, respectively, and through corresponding input registers of the first pipeline stage pass to the inputs $X_{1,u}, ..., X_{s,u}$ and $Y_{1,u}, ..., Y_{s,u}$ (u=(t−1)mod p+1) of the computational units $DS_{1,u}, ..., DS_{s,u}$ after one operating step. The difference data $\{a_{(t-1)s+1}, ..., a_{ts}\}$ and the sign data $\{b_{(t-1)s+1}, ..., b_{ts}\}$ ($a_i+b_i=|x_i-y_i|$) corresponding to that portion of input data are generated with the delay of approximately p operating steps (that is after the operating step t+p+1) at the outputs of computational units 2. This is shown in FIG. 5b as a timing diagram.

Figure 5C:
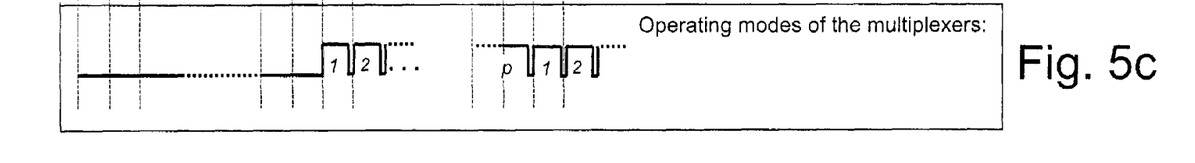
FIG. 5c shows as a timing diagram the operating cycles of the multiplexers of a first pipeline stage of the SAD calculation means according to an advantageous embodiment of the invention.

Outputs of the computational units 2 are connected to n-bit p to 1 multiplexer 4 or one-bit p to 1 multiplexer 5. Outputs $A_{i,j}$, j=1, ..., p, of all the computational units $DS_{i,j}$, j=1, ..., p, of the $i^{th}$ group, i=1, ..., s, are connected to the inputs of an n-bit p to 1 multiplexer 4 (n-$MUX_i$) having a single n-bit output $A_i$. Similarly, outputs $B_{i,j}$, j=1, ..., p, of all the computational units $DS_{i,j}$ of the $i^{th}$ group, i=1, ..., s, are connected to the inputs of a 1-bit p to 1 multiplexer 5 (1-$MUX_i$) having a single 1-bit output $B_i$. Multiplexers 4, 5 pass signals from their inputs to their outputs according to circular mod p rule so that, at the operating step t+p+1, t=1, 2, ..., ⌈K/s⌉, the multiplexer n-$MUX_i$, 1-$MUX_i$ connects the output of the $u^{th}$ (u=(t−1) mod p+1) computational unit $DS_{i,u}$ of the group i=1, ..., s to the output of the multiplexer. From considerations presented above it can be determined that at operating steps t+p+1, t=1, 2, ..., ⌈K/s⌉ exactly computational units $DS_{i,u}$ (u=(t−1)mod p+1) have performed the calculation of the difference data and the sign corresponding to the data portion $\{x_{(t-1)s+1}, ..., x_{ts}\}$ and $\{y_{(t-1)s+1}, ..., y_{ts}\}$. Thus, multiplexers 4, 5 advantageously operate so that at the end of the operating step t+p+1, t=1, 2, ..., ⌈K/s⌉ the sign and difference data $\{b_{(t-1)s+1}, ..., b_{ts}\}$ are passed to the outputs of the multiplexers 4, 5. This is illustrated in FIG. 5c as a timing diagram.

Outputs of the multiplexers 4, 5 are connected to the inputs of the second pipeline stage P2 through the output registers 8 of the first pipeline stage. The second pipeline stage P2 is a compression array 6 having s inputs from the first pipeline stage P1 (instead of m=ps inputs as in prior art apparatuses) and two feedbacks from its sum 9 and carry outputs 10. The compression array 6 updates the values of its sum and carry terms at every operating step by accumulating the sign and difference data at the outputs of multiplexers 4, 5. It is assumed here that the delay of the compression array is approximately equal to the duration of the operating step of the SAD calculation means. Accumulation is started from the operating step p+2 when the first sign and difference data portion are available at the outputs of the multiplexers 4, 5 until the end of the operating step. After the accumulation of all value pairs is performed, the output of the compression array 6 comprises the sign and difference data.

The second pipeline stage P2 has also output registers 11 which temporarily store the values of the sum and carry term calculated by the compression array 6. This is necessary for proper control of the synchronized pipeline clock timing. The output registers 11 are also used to store the sum and carry term and to feed these terms back to input of the compression array 6 to be summed in the subsequent operation step.

The compression array 6 of the second pipeline stage P2 is advantageously a carry-save adder tree constructed either from full adders (FA) or 4/2-ratio compressors which are known as such. Different constructions of the tree are possible. In particular, those used in prior art can be utilized. The main difference of the proposed architecture from prior art is that the compression array has only s=m/p (instead of m) n-bit and as much single-bit inputs in addition to two feedback inputs from the sum 9 and carry outputs 10 of the compression array 6 itself. Thus, in the SAD calculation means 1 according to an advantageous embodiment of the present invention having m computational units 2 in the first pipeline stage P1, substantially similar compression array may be used as in such prior art devices which are constructed for the case of only s=m/p computational units. In addition, feedbacks from the compression array outputs 9, 10 are allowed to be connected to not only its first level but to any of its levels.

Since the compression array 6 has less number of inputs it can be constructed using smaller number of full adders or 4/2-ratio compressors as compared to prior art apparatuses having the same number of computational units 2. The compression array 6 also has smaller number of levels resulting in a shorter delay. The duration of the operating step, or the basic operational clock time unit $T_p$, of the SAD calculation means according to an advantageous embodiment of the present invention is defined as the delay of the compression array 6 if the parameters p and s are properly chosen.

It can be seen from the above considerations that the total number of operating steps needed to compute the sum and carry terms of the sum of absolute differences between two data sets of m samples each is given by $$T_{total} = (\lceil K/s \rceil + p + 2) T_p, \quad (3)$$

for both the apparatus of U.S. Pat. No. 5,864,372 where s=m and the SAD calculation means 1 of the invention but, the duration $T_p$ of the operating step is shorter for the SAD calculation means 1 of the invention than that of the apparatus of U.S. Pat. No. 5,864,372. It is also obvious that the silicon area needed to implement the SAD calculation means 1 of the invention is also smaller compared to the area of the apparatus of U.S. Pat. No. 5,864,372 due to smaller width and number of levels within the compression array.

The third pipeline stage P3 comprises an adder 12 which adds the calculated sum and carry terms to produce the sum of absolute differences between the block under examination and current reference block. It is also possible that the adder 12 calculates e.g. the mean absolute error (MAE) by dividing the sum of absolute errors SAD(X,Y) by the number K of its addends as was described earlier in this application. In the minimum evaluator 13 of the fourth pipeline stage P4 the newest calculation result is compared with a minimum SAD value of previously calculated results. If the newest calculation result is smaller than previously found minimum SAD value, the minimum SAD value is replaced with the newest calculated result. The minimum evaluator 13 has means 14 for storing the minimum SAD value e.g. memory means. In the beginning of the SAD calculation for the block under examination the minimum SAD value is set to a large default value to assure that the first calculated result will be stored as the minimum SAD value because there is no previously calculated value for the block under examination to compare with.

After the comparison stage, in this advantageous embodiment of the invention, it is examined if all reference blocks are used for calculating the SAD values for the block under examination. If there still exists at least one reference block which is not yet used in the calculation of the SAD value for the current block, above described procedure is repeated. Otherwise, the found minimum SAD value will be used in later stages of the video encoding process to determine, if the current block will be encoded as such or motion compensated. The minimum evaluator 13 determines the coordinates of the block which produced the minimum SAD value for the current block and transfers the coordinate information together with the minimum SAD value to the decision means 15. In the decision means 15 the minimum SAD value is examined to determine if the current block will be encoded as such or motion compensated. The decision means 15 can, for example, evaluate the amount of information which is needed to transfer the block and the amount of information which is needed to transfer the motion compensated information. Then, the decision means 15 advantageously select that alternative which needs less information transfer capacity.

In a situation in which the motion compensated information is selected to be transmitted instead of the block itself, transmitted information comprise advantageously at least the coordinate information and motion error information. The coordinate information is used to inform the decoder which previously received and decoded reference block was used to form the motion vector. The motion error information is the difference between respective pixel values of the current block and the reference block. The decoder can then form the image information of the current block by using said reference block corrected with the motion error information.

In the following the selection of the parameters s and p will be described. In the first example, the total number of calculation units 2 within the first pipeline stage P1 is supposed to be fixed. In this example the number of calculation units 2 involved in the first pipeline stage P1 is eight (m=8). There are then several possibilities to choose the parameters p and s as summarized in Tables 2 and 3 corresponding to two cases where full adders (FA) or 4/2 ratio compressors are used to construct the compression array 6. In these tables $N_{FA}$ is the number of levels within the corresponding compression array 6, $G_{total}$ is an estimate of the total gate count of the first two pipeline stages P1, P2 of the SAD calculation unit 1 (pipeline registers are not counted), $D_{FA}$ is the delay of the compression array, $T_p$ and $T_{total}$ are the same as in the equation (3). The last columns of the tables present the relative utilization time of the compression array 6. The numbers for $G_{total}$ are given as the sum $G_{total} = G_{DS} + G_{MUX} + G_{CA}$, where the addends represent gate counts for the block of calculation units 2 for the multiplexers 4, 5, and for the compression array 6, respectively. These numbers have been counted by using the estimates of the gate counts of basic components in terms of equivalent NAND gates as summarized in Table 4.

Figure 6:
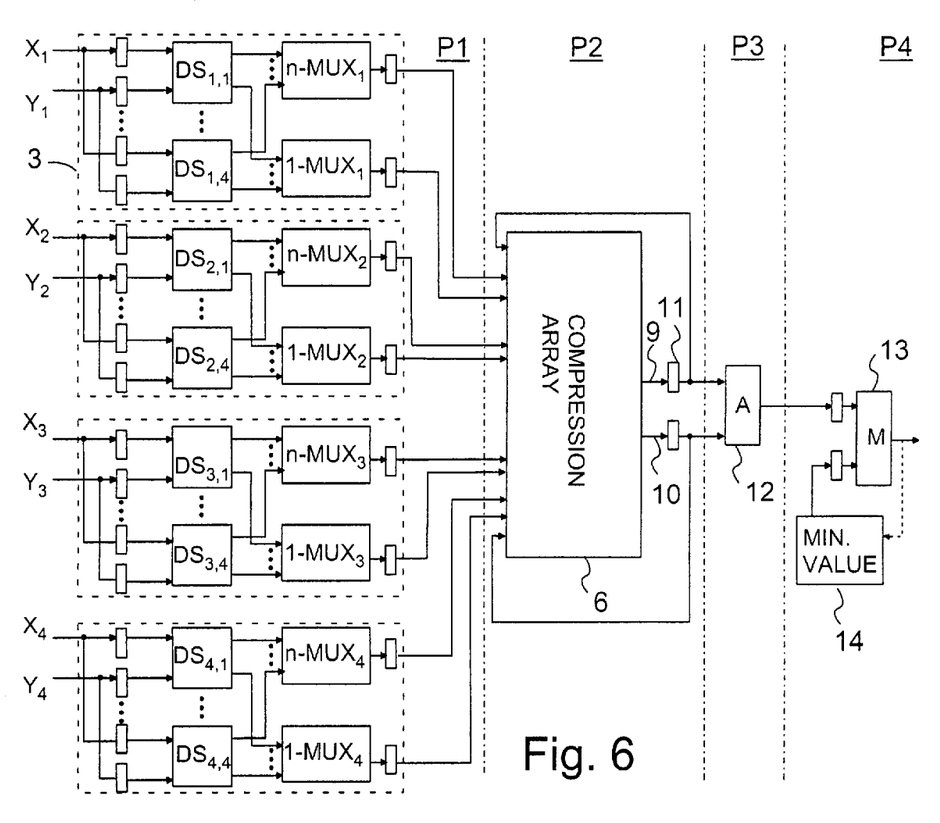
FIG. 6 shows, in a simplified block diagram, a SAD calculation means according to an advantageous embodiment of the invention.

The first rows of Tables 2 and 3 represent the apparatus of the U.S. Pat. No. 5,864,372 which corresponds to the case where p=1. The architecture presented by the second rows of these tables is depicted in FIG. 6. The architectures corresponding to the other cases are derived in a similar way. As follows from these tables both the gate count and the processing time decrease as the value of p increases.

four n-bit, four single-bit and two (2n−1)-bit inputs. From Table 1 it can be seen that the delay of the compression array is $6\tau$ while the throughput of the first pipeline stage is $16\tau$ resulting in poor balancing between the stages. However, the present invention allows to increase the number of DS units within the first stage up to m=16 (s=4, p=4) and still using the same compression array as within the apparatus of the

TABLE 2

| P | S | $N_{FA}$ | $G_{DS} + G_{MUX} + G_{CA} = G_{total}$ | $D_{DS}$ | $D_{FA}$ | $T_p$ | $T_{total} = (\lceil K/s \rceil + p + 2)T_p$ | CA utilization |
|---|---|---|---|---|---|---|---|---|
| 1 | 8 | 5 | 656 + 0 + 517 = 1173 | $16\tau$ | $10\tau$ | $16\tau$ | $\left(\frac{256}{8}+3\right)16\tau = 560\tau$ | ≈ 62.5% |
| 2 | 4 | 3 | 656 + 81 + 269 = 1006 | $8\tau$ | $6\tau$ | $8\tau$ | $\left(\frac{256}{4}+4\right)8\tau = 544\tau$ | ≈ 75% |
| 4 | 2 | 2 | 656 + 90 + 126 = 872 | $4\tau$ | $4\tau$ | $4\tau$ | $\left(\frac{256}{2}+6\right)4\tau = 536\tau$ | ≈ 100% |
| 8 | 1 | 1 | 656 + 113 + 88 = 857 | $2\tau$ | $2\tau$ | $2\tau$ | $(256 + 10) \cdot 2\tau = 532\tau$ | ≈ 100% |

TABLE 3

| P | S | $N_{FA}$ | $G_{DS} + G_{MUX} + G_{CA} = G_{total}$ | $D_{DS}$ | $D_{4/2}$ | $T_p$ | $T_{total} = (\lceil K/s \rceil + p + 2)T_p$ | CA utilization |
|---|---|---|---|---|---|---|---|---|
| 1 | 8 | 3 | 656 + 0 + 423 = 1079 | $16\tau$ | $9\tau$ | $16\tau$ | $\left(\frac{256}{8}+3\right)16\tau = 560\tau$ | ≈ 56.2% |
| 2 | 4 | 2 | 656 + 81 + 218 = 955 | $8\tau$ | $6\tau$ | $8\tau$ | $\left(\frac{256}{4}+4\right)8\tau = 544\tau$ | ≈ 75% |
| 4 | 2 | 1 | 656 + 90 + 123 = 869 | $4\tau$ | $3\tau$ | $4\tau$ | $\left(\frac{256}{2}+6\right)4\tau = 536\tau$ | ≈ 75% |

TABLE 4

| NAND | Inverter | XOR | FA | HA | 4/2-ratio compres. | 2 to 1 MUX | 4 to 1 MUX | 8 to 1 MUX |
|---|---|---|---|---|---|---|---|---|
| 1 | 0.75 | 2.5 | 7 | 4 | 11 | 2.25 | 5 | 12.5 |

In another example it is assumed that the input bus width is restricted to e.g. 64 bits in a situation where the SAD calculation means 1 is integrated into a system (but still operates at its own clock). If no buffering or another technique (anyway increasing the gate count) is utilized this would mean that the upper bound for the number of DS units involved within the first pipeline stage is m=4 (s=4, p=1) for the apparatus of the U.S. Pat. No. 5,864,372. The compression array of the apparatus is a carry save adder tree having U.S. Pat. No. 5,864,372. Table 5 summarizes the area-time characteristics of the resulting architectures depending on p (the first row with p=1 corresponds to the apparatus of the U.S. Pat. No. 5,864,372). Compression arrays based on full adders have been used in this example. As it can be seen, the total processing time of the first two pipeline stages P1, P2 can be decreased by 2.59 while preserving the same input bus width by using the invention with p=3 instead of the apparatus of the U.S. Pat. No. 5,864,372 (p=1). Naturally, the gate count is also increased almost proportionally (2.37 times). Increasing the parameter p further does not necessarily lead to an improvement since the first pipeline stage P1 becomes then unnecessarily faster than the compression array 6.

TABLE 5

| p | $G_{DS} + G_{MUX} + G_{CA} = G_{total}$ | $D_{DS}$ | $D_{FA}$ | $T_p$ | $T_{total} = (\lceil K/s \rceil + p + 2)T_p$ |
|---|---|---|---|---|---|
| 1 | 328 + 0 + 269 = 597 | $16\tau$ | $6\tau$ | $16\tau$ | $\left(\frac{256}{4}+3\right)16\tau = 1072\tau$ |
| 2 | 656 + 81 + 269 = 1006 | $8\tau$ | $6\tau$ | $8\tau$ | $\left(\frac{256}{4}+4\right)8\tau = 544\tau$ |

TABLE 5-continued

| p | $G_{DS} + G_{MUX} + G_{CA} = G_{total}$ | $D_{DS}$ | $D_{FA}$ | $T_p$ | $T_{total} = (\lceil K/s \rceil + p + 2)T_p$ |
|---|---|---|---|---|---|
| 3 | 984 + 162 + 269 = 1415 | 6τ | 6τ | 6τ | $\left(\frac{256}{4} + 5\right)6\tau = 414\tau$ |
| 4 | 1312 + 180 + 269 = 1761 | 4τ | 6τ | 6τ | $\left(\frac{256}{4} + 6\right)6\tau = 420\tau$ |

Further improvement is possible by splitting the compression array 6 into two pipeline stages and making the feedback loop shorter. In the case of the present invention this is useful in all the cases where the number p of calculation units 2 within each group 3 of them becomes so large that the first stage P1 becomes faster than the second stage P2 (the compression array 6). The last row of Table 5 corresponds to an example where that kind of arrangement could be useful. In this case the compression array could be divided into two pipeline stages each being a compression array with four inputs and, thus, having a delay of 4τ which then would be the duration of the operating step. Then the time $T_{total}$ to find the final sum and carry terms of an SAD at the output of the second compression array would be reduced to $$T_{total} = \left(\left\lceil \frac{K}{s} \right\rceil + p + 3\right) = \left(\frac{256}{4} + 7\right)4\tau = 284\tau$$

(3.77 times faster than the apparatus of the U.S. Pat. No. 5,864,372).

The parameters s and p of the SAD calculation unit 1 according to the invention can be selected so that the overall performance is optimum in practical implementations.

Figure 8:
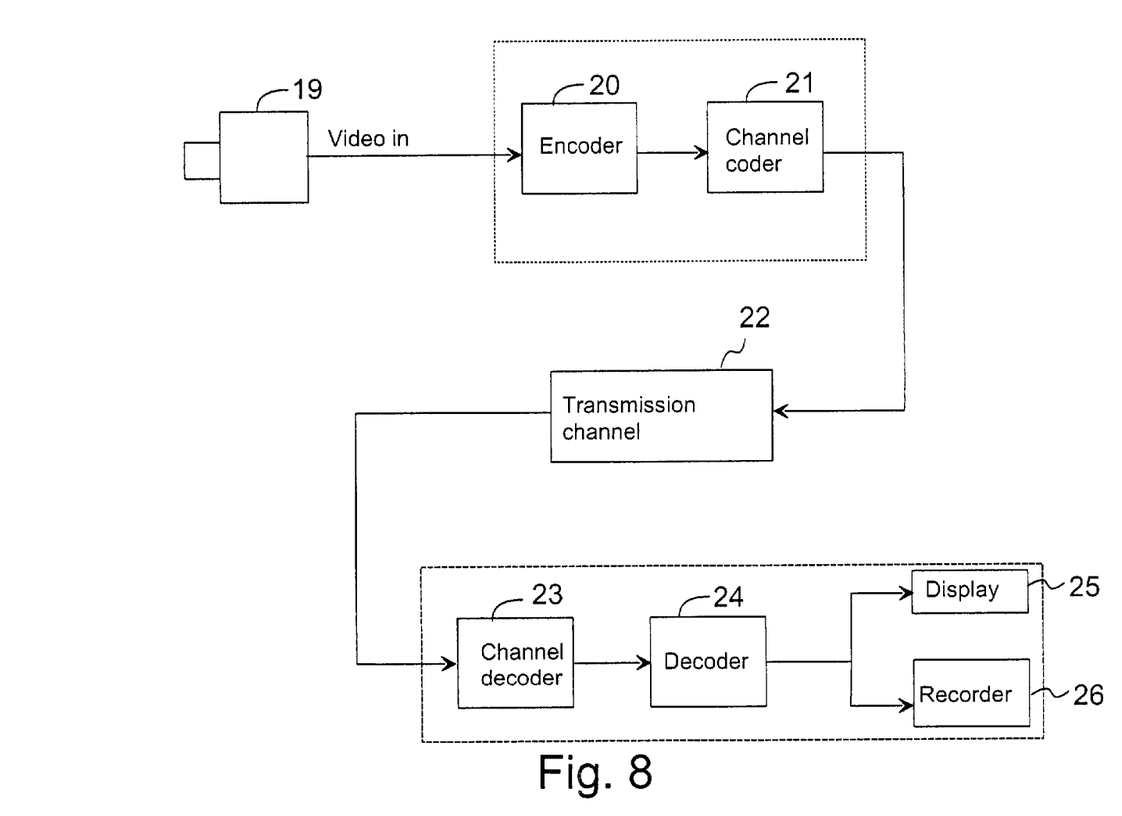
FIG. 8 shows, in a simplified block diagram, a video transmission system according to an advantageous embodiment of the invention.

Next, a video transmission system according to an advantageous embodiment is described with reference to the block diagram of FIG. 8. The video signal to be transmitted is taken e.g. by the video camera 19 or it can be retrieved from video storing means (not shown) such as video recorder, digital disk etc. The video signal is transferred to the encoder 20, which performs the coding of the video signal including the motion estimation according to the present invention. The encoded video signal is then channel coded in the channel coder 21, if necessary. The purpose of the channel coding is to transform the coded video signal into a form suitable for transmission via the transmission channel 22. The details of the channel coding can vary in different implementations of the video coding system and they are known to a skilled person.

In the receiver the channel coded video signal is channel decoded in channel decoder 23 to retrieve the encoded video signal. After that, the decoder 24 decodes the video signal to produce a video signal which should substantially correspond with the original signal. However, in practice there are some potential error sources which can affect the transferred video signal wherein the decoded video signal may differ from the original video signal. Error correction mechanisms are developed to minimize effects of such transmission errors.

The decoded video signal can then be displayed on the video monitor 25 and/or it can be stored into the storing means 26.

Figure 7:
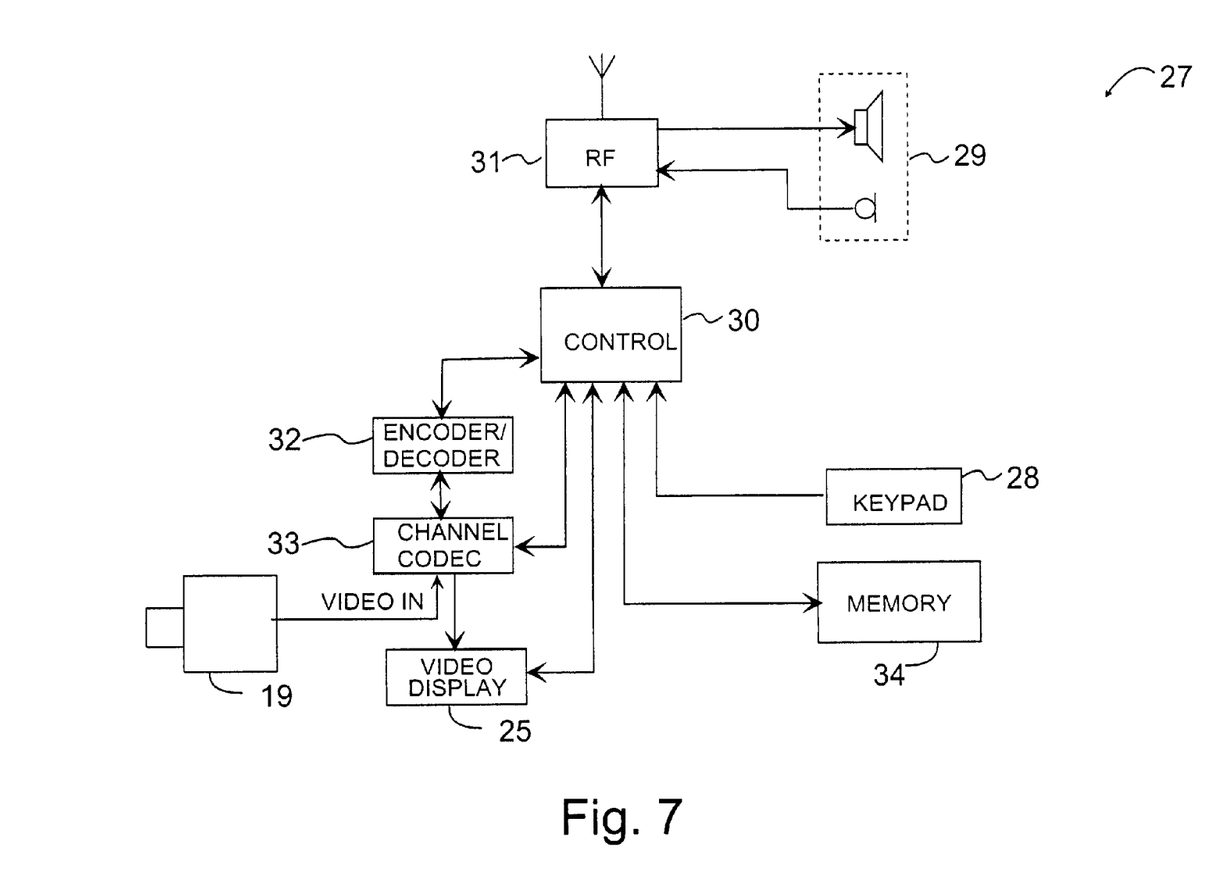
FIG. 7 shows, in a simplified block diagram, a communication device according to an advantageous embodiment of the invention.

The FIG. 7 presents the video encoding device 27 according to an advantageous embodiment of the invention in a simplified manner. The terminal in question is suitable for both transmitting and receiving, but the invention can also be applied in connection with simplex terminals. In the video encoding devices 27 all the functional features presented in the block diagram of FIG. 7 are not necessarily required, but within the scope of the invention it is also possible to apply simpler video encoding devices 27, for example without keyboard 28 and audio means 29. In addition to said keyboard 28 and audio means 29, the video terminal also comprises video means, such as a video monitor 25, a video camera 19 or the like.

To control the functions of the video encoding device 27, it comprises a control unit 30, which comprises, for example, a microcontrolling unit (MCU), a microprocessing unit (MPU), a digital signal processor and/or the like. In addition, the control unit 30 contains memory means 34 e.g. for storing application programs and data, and bus interface means I/O for transmitting signals between the control unit 30 and other functional blocks. The video encoding device 27 also comprises a video codec 32 which perform the encoding/decoding and compression/decompression of the video information. The compression is e.g. based on DCT transform and quantization, wherein in a decompression phase, the received information is dequantized and inverse DCT transformed, known as such. A channel codec 33 performs the channel coding for information to be transmitted and channel decoding of received information. The transmission of the channel coded video signal can be performed by e.g. the mobile communication means 31.

It should be evident that the present invention is not limited solely to the above-presented embodiments, but it can be modified within the scope of the appended claims.

The invention claimed is:

1. Method for performing video motion estimation in video encoding, in which a video signal includes video frames, video frames comprise blocks, and a combined comparison value is formed by using a current video block of a frame to be encoded and at least one other video block of another frame, said current video block of the frame to be encoded comprises a set of first data values, said at least one other video block of another frame comprises a set of second data values, data value pairs are formed of data values from said set of first data values and equal number of corresponding data values from said set of second data values, said combined comparison value is formed by defining comparison values, each of which is defined by using data values of one data value pair of said data value pairs, and said data value pairs are divided into at least two sub-sets of data value pairs, each sub-set comprising equal number of data value pairs, wherein the calculation of said comparison values is interlaced such that the calculation of comparison values of one sub-set of data value pairs is initiated in a time after initiating and before completing the calculation of comparison values of another sub-set of data value pairs.

2. A method according to claim 1, wherein a comparison value is defined by calculating a difference between a data value pair.

3. A method according to claim 2, wherein a comparison value is defined for each data value pair of each sub-set of data value pairs.

4. A method according to claim 1, wherein said combined comparison value is defined by summing up said comparison values.

5. A method according to claim 1, wherein operation steps are performed in the method, and that at each operation step each data value pair of one sub-set of data value pairs is entered for calculation of comparison values.

6. A method according to claim 5, wherein the comparison values for said entered data value pairs of one sub-set of data value pairs is generated within a delay of p operating steps, in which p is predefined integer greater than 1.

7. A method according to claim 1, wherein the combined comparison value is calculated between a current video block of a frame to be encoded and video blocks of another frame, and that the block of another frame which produces the smallest combined comparison value is selected for motion estimation.

8. A method according to claim 1, wherein each block comprise 16 rows by 16 pixel data values, the pixel data values are divided into 16 sub-sets of 16 pixel data value pairs, therein 16 comparison values are defined for each sub-set, and said combined comparison value is defined by combining 256 comparison values.

9. A method according to claim 1, wherein each block comprise 16 rows by 16 pixel data values, the pixel data values of one block are paired with 16×16 pixel data values of another block, the pixel data value pairs are divided into 64 subsets $D_1, D_2 \ldots, D_{64}$ of 4 pixel data value pairs each, comparison value calculations for the subset of value pairs $_{Di}$, i=1, 2, . . . , 64, are initiated at the operating step t=i+1 and are completed at the operating step t=i+4, and said combined comparison value is defined by combining comparison values calculated for said 64 subsets $D_1, D_2 \ldots, D_{64}$, wherein the combination of comparison values of the subset $D_i$, i=1, 2, . . . , 64 is performed at the operating step t=i+5.

10. System for performing video motion estimation in video encoding, in which video signal comprises frames which comprise blocks, the system comprising means for forming a combined comparison value by using a current video block of a frame to be encoded and at least one other video block of another frame, said current video block of the frame to be encoded comprises a set of first data values, said at least one other video block of another frame comprises a set of second data values, said means for forming a combined comparison value comprises input means for entering a series of at least two sub-sets each sub-set consisting of equal number of data value pairs of data values from said set of first data values and equal number of corresponding data values from said set of second data values, means for defining comparison values, each of which is defined by using data values of one data value pair of said data value pairs, the system further comprising means for interlaced calculation of said comparison values comprising means for initiating the calculation of comparison values of one sub-set of data value pairs in a time after initiating and before completing the calculation of comparison values of another sub-set of data value pairs.

11. A system according to claim 10, wherein said means for performing interlaced calculation of a combined comparison value comprises s groups of computational units, each group comprising:

p computational units, one pair of input means for inputting one data value pair at a time, multiplexers, and registers, wherein for interlaced calculation of said comparison values said sub-sets of s data value pairs are arranged to be entered to the s pairs of input means of said s groups, and the series of value pairs entered to a group are distributed among said computational units of the group in time such that the calculation of comparison values for every next data value pair is arranged to be initiated after and before completing calculations for previous data value pair.

12. A system according to claim 10, wherein said means for defining comparison values comprise means for calculating a difference between a value pair.

13. A system according to claim 10, wherein means for defining combined comparison values comprise a compression array.

14. A system according to claim 13, wherein the number of inputs for inputting comparison values to the compression array is smaller than the number of the computational units.

15. A system according to claim 10, wherein the video blocks comprise K data values, the system comprises s groups of computational units, each group comprises p computational units, and the values s and p are selected such that K=s*p, in which p is predefined integer greater than 1.

16. A system according to claim 10, wherein said means for defining a combined comparison value comprise addition means.

17. Video encoding device, which comprises means for encoding video signal comprising frames which comprise blocks, means for performing video motion estimation, means for calculating a combined comparison value between a current video block of a frame to be encoded and at least one other video block of another frame, said current video block of the frame to be encoded comprises a set of first data values, said at least one other video block of another frame comprises a set of second data values, said means for forming a combined comparison value comprises input means for entering a series of at least two subsets each consisting of equal number of data value pairs of data values from said set of first data values and equal number of corresponding data values from said set of second data values, comprise means for defining comparison values, each of which are defined by using data values of one data value pair of said data value pairs, wherein the device further comprising means for interlaced calculation of said comparison values comprising means for initiating the calculation of comparison values of one sub-set of data value pairs in a time after initiating and before completing the calculation of comparison values between value pairs of another sub-set of data value pairs.

18. A device according to claim 17 further comprising means for performing mobile communication.

19. Video encoding device, which comprises means for encoding video signal comprising frames which comprise blocks, means for performing video motion estimation, a compression array for forming a combined comparison value by using a current video block of a frame to be encoded and at least one other video block of another frame, said current video block of the frame to be encoded comprises a set of first data values, said at least one other video block of another frame comprises a set of second data values, said compression array comprises input means for entering a series of at least two sub-sets each sub-set consisting of equal number of data value pairs of data values from said set of first data values and equal number of corresponding data values from said set of second data values, means for defining comparison values, each of which is defined by using data values of one data value pair of said data value pairs, the video encoding device further comprising means for interlaced calculation of said comparison values comprising:

means for initiating the calculation of comparison values of one sub-set of data value pairs in a time after initiating and before completing the calculation of comparison values of another sub-set of data value pairs, and     s groups of computational units, each group comprising:
      p computational units,
      one pair of input means for inputting one data value pair at a time,
      multiplexers, and
      registers, wherein for interlaced calculation of said comparison values said sub sets of s data value pairs are arranged to be entered to the s pairs of input means of said s groups, and the series of value pairs entered to a group are distributed among said computational units of the group in time such that the calculation of comparison values for every next data value pair is arranged to be initiated after and before completing calculations for previous data value pair, and the number of inputs for inputting comparison values to the compression array is smaller than the number of the computational units.

\* \* \* \* \*